(12) United States Patent  
Bognár et al.

(10) Patent No.: US 6,699,121 B2
(45) Date of Patent: Mar. 2, 2004

(54) COMMINUTING DEVICE IN AN AGRICULTURAL HARVESTING MACHINE

(75) Inventors: József Bognár, Gödöllö (HU); Bodo Kühn, Gütersloh (DE); Franz Heidjann, Harsewinkel (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 10/075,352

(22) Filed: Feb. 14, 2002

(65) Prior Publication Data

US 2002/0119809 A1 Aug. 29, 2002

(30) Foreign Application Priority Data

Feb. 16, 2001 (DE) .......................... 101 07 776

(51) Int. Cl.[7] .................................. A61F 12/40
(52) U.S. Cl. ......................................... 460/112
(58) Field of Search ................. 460/112, 111, 460/71, 901; 56/505, 504; 239/668, 681, 243

(56) References Cited

U.S. PATENT DOCUMENTS

| | | | | |
|---|---|---|---|---|
| 9,114 A | * | 7/1852 | Gilbert | 460/71 |
| 2,813,684 A | * | 11/1957 | Jensen | 241/194 |
| 3,103,241 A | | 9/1963 | Weigel | |
| 3,309,854 A | * | 3/1967 | Mitchell et al. | 56/504 |
| 3,397,525 A | * | 8/1968 | Woodring | 56/294 |
| 3,423,920 A | * | 1/1969 | Woodring et al. | 56/294 |
| 3,465,507 A | * | 9/1969 | Fishaw | 56/294 |
| 3,604,188 A | * | 9/1971 | Mott | 56/294 |
| 3,690,359 A | * | 9/1972 | Wenzel et al. | 241/101.742 |
| 3,874,604 A | * | 4/1975 | Gronberg et al. | 241/243 |
| 4,211,060 A | * | 7/1980 | Rhodes | 56/294 |
| 4,422,358 A | * | 12/1983 | Hull et al. | 83/356.3 |
| 4,612,941 A | * | 9/1986 | Kunde | 460/112 |
| 5,042,973 A | * | 8/1991 | Hammarstrand | 460/112 |
| 5,232,405 A | | 8/1993 | Redekop et al. | |
| 5,272,861 A | * | 12/1993 | Roynberg | 56/504 |
| 5,482,508 A | | 1/1996 | Redekop et al. | |
| 5,556,042 A | * | 9/1996 | Roberg | 241/101.76 |
| 5,928,080 A | * | 7/1999 | Jakobi | 460/112 |
| 6,120,373 A | * | 9/2000 | Schrattenecker | 460/112 |
| 6,251,009 B1 | * | 6/2001 | Grywacheski et al. | 460/112 |
| 6,478,674 B2 | * | 11/2002 | Redekop | 460/112 |

FOREIGN PATENT DOCUMENTS

DE          39 25 701          4/1997

* cited by examiner

Primary Examiner—Árpád F Kovács
(74) Attorney, Agent, or Firm—Husch & Eppenberger, LLC; Robert E. Muir; Robert C. Haldiman

(57) ABSTRACT

An agricultural harvesting machine has a comminuting device which includes a chopper rotor having a rotor shaft, and a conveying element pivotably connected with the rotor shaft. The conveying element is formed by a first arm and a second arm which are interconnected by a cross web. In one embodiment the cross web has a recess between the first and second arms, and a cutting element is provided which passes either through the recess of the conveying element or outside of the first and second arms of conveying element as the conveying element rotates. In another embodiment the conveying element is provided with both leading and trailing cutting edges arranged in sets. Initially one set of cutting edges is utilized and the conveying element can latter be reversed in position to utilize the other set.

28 Claims, 5 Drawing Sheets

COMMINUTING DEVICE IN AN AGRICULTURAL HARVESTING MACHINE

FIELD OF THE INVENTION

The invention relates generally to agricultural machinery and, more particularly, to a comminuting device in an agricultural harvesting machine.

BACKGROUND OF THE INVENTION

U.S. Pat. No. 5,482,508 describes a comminuting device used in agricultural harvesting machines. This comminuting device includes a chopper rotor with a shaft. The chopper rotor is equipped with material conveying and comminuting beaters. The material conveying beaters are pivotably attached to holding flanges fixed to the rotor shaft by means of a screw joint. The material conveying beaters themselves are constructed in two parts. These two beater portions, which together form a common material conveying beater, are spaced apart by means of a bushing arranged at one end. This design creates a through-channel extending along the whole length between the two beater portions. This through-channel is designed to allow a cutter blade that is fixed to the surrounding housing of the chopper rotor to pass between the beater portions while the chopper rotor rotates. When the chopper rotor rotates the material conveying beaters adopt a position oriented radially to the shaft of the chopper rotor due to centrifugal force.

It is desirable to break up the chaff and straw from the harvested crop into very small pieces in order to facilitate decay. This requires designing the comminuting device with as many cutting edges as possible. However, the comminuting device must also be able to dispose of whatever volume of crop stream is fed into it. U.S. Pat. No. 5,232,405 discloses a comminuting device having material conveying beaters with paddle-like extensions integrally formed into the area of the beaters facing away from the rotor. Unfortunately, this design resulted in a considerable reduction in the number of cutting elements that could be fit into the device since the cutting elements could only be positioned in the gaps between adjacent beaters.

U.S. Pat. No. 5,482,508 attempted to address this deficiency with material conveying beaters constructed in two parts that were spaced apart so that cutting elements could also pass between the two beater parts. However, this split beater design drastically reduces the beater's conveying and material removing capacity. In addition, the split beaters are vulnerable to blockage by long-stalked crops. This design also requires more power to drive the chopper rotor and impedes movement of the crop through the comminuting device to higher energy requirements for driving the chopper rotor, above all this led to the movement of the crop through the comminuting device being impeded.

The present invention is directed to overcoming one or more of the problems set forth above.

SUMMARY OF THE INVENTION

An aspect of the present invention is to provide a comminuting device with improved chopping ability and increased material conveying and throughput capability.

In accordance with the above aspect of the invention, there is provided a comminuting device including a chopper rotor having a rotor shaft and a conveying element pivotably connected with the rotor shaft of the chopper rotor, wherein the conveying element is formed by a first arm and a second arm with the first and second arms being connected with each other by a cross web.

In another embodiment, a comminuting device includes a chopper rotor having a rotor shaft; a first conveying element pivotably connected with the rotor shaft and carried with the rotor shaft as it rotates, said conveying element being formed by first and second arms that are connected with each other by a cross web and having a recess between the first and second arms; and a first cutting element connected with a frame associated with the agricultural machine which cooperates with the conveying element as the conveying element rotates with the rotor shaft.

These aspects are merely illustrative aspects of innumerable aspects associated with present invention and should not be deemed as limiting in any manner. These and other aspects, features and advantages of the present invention will become apparent form the following detailed description when taken in conjunction with referenced drawings.

BRIEF DESCRIPTION OF THE DRAWINGS

Reference is now made to the drawings, which illustrate the best known mode of carrying out the invention and wherein the same reference characters indicate the same or similar parts throughout the views.

DETAILED DESCRIPTION

Figure 1:
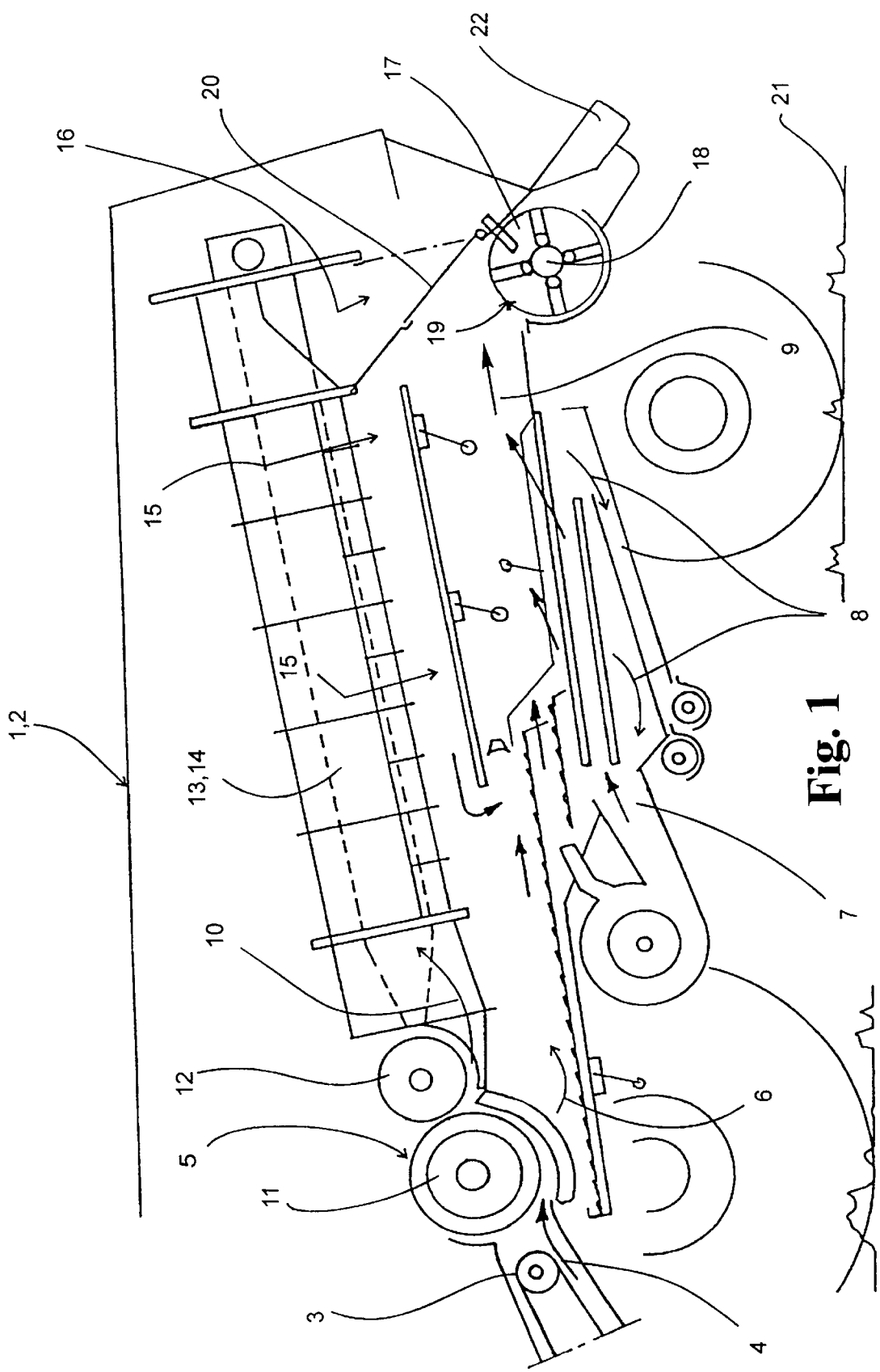
FIG. 1 is a schematic partial side view of a combine harvester incorporating a comminuting device embodying the present invention.

FIG. 1 illustrates an agricultural machine 1. In this particular embodiment, the agricultural machine 1 is a combine harvester. The machine 1 has a crop pick-up device 3 at its front end, which feeds harvested material 4 to a tangential threshing mechanism 5. The tangential threshing mechanism 5 is composed of one or more threshing members 11, 12. The threshing mechanism 5 separates the harvested crops 4 into two crop streams 8, 9. The first crop stream 8 primarily contains grain while the second crop stream 9 contains short straw and chaff. A third crop stream 10 is also produced by the threshing members 11, 12 and directed to a grain/straw separator 14. In the embodiment shown, the separator 14 is an axial flow rotor. The grain/straw separator 14 divides crop stream 10 into a first partial stream 15 consisting of grain, short straw and chaff and a second crop stream consisting of long straw.

A comminuting device 17 is located in the bottom rear region of the agricultural machine 1. The comminuting device 17 is associated with the grain/straw separator 14 and rotates in the direction of arrow 19 (clockwise) about a shaft 18. Crop stream 9 is fed into the comminuting device 17 as it leaves a cleaning device 7. Crop stream 16 also passes into the comminuting device 17 after being expelled by the grain/straw separator 14. The comminuting device 17 then processes, as explained in more detail below, and conveys these crop streams 9, 16 out of the back of the agricultural machine 1. A distributing device 22 spreads the processed crop waste from the comminuting device 17 in a wide pattern in order to encourage rapid decay of the waste. In the embodiment shown, the machine 1 is also equipped with a pivotable material guide device 20 that can be closed so that crop stream 16 bypasses the comminuting device 17 and exits the machine 1 without being processed.

Figure 2:
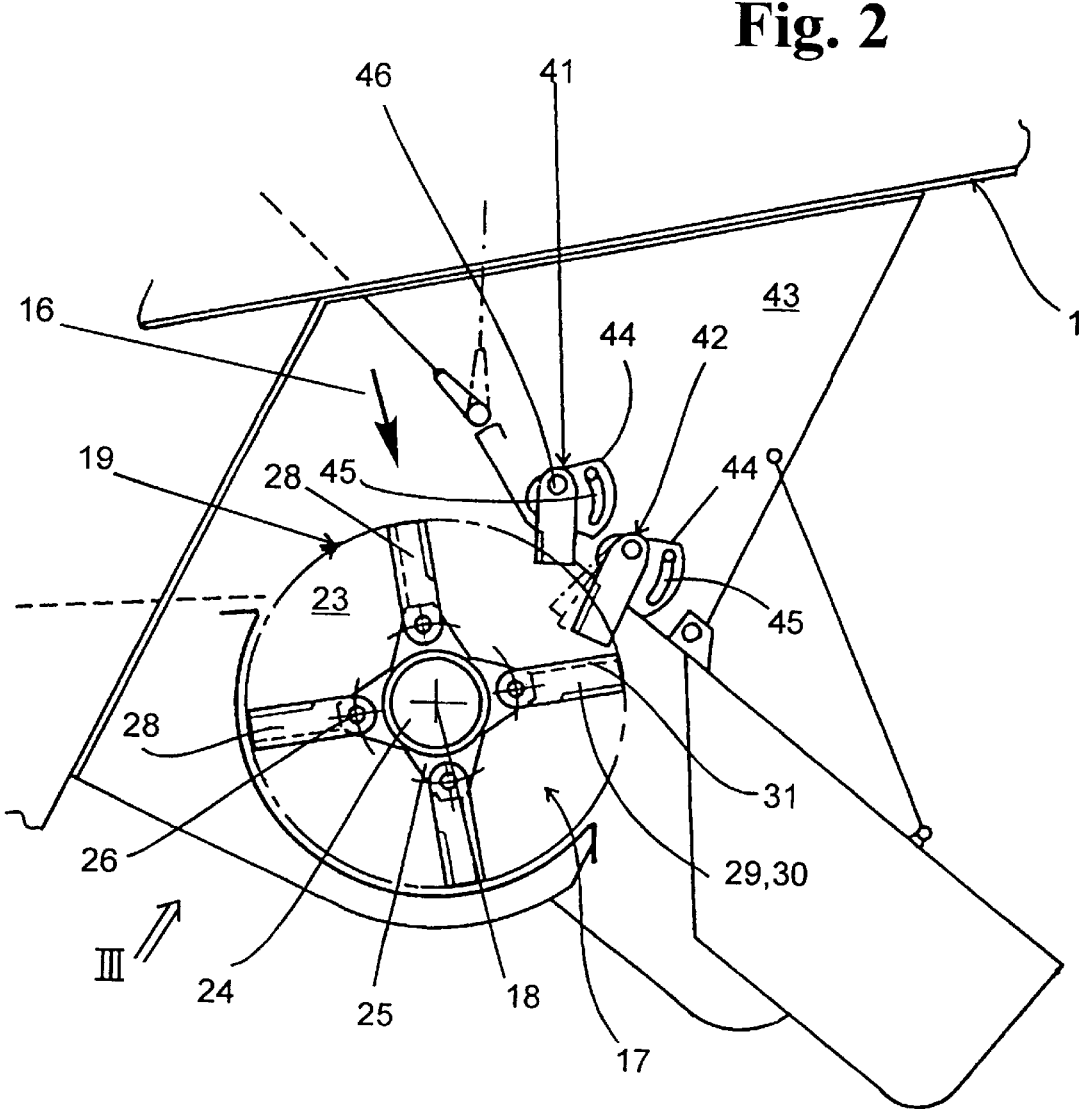
FIG. 2 is a side view of the comminuting device.
Figure 3:
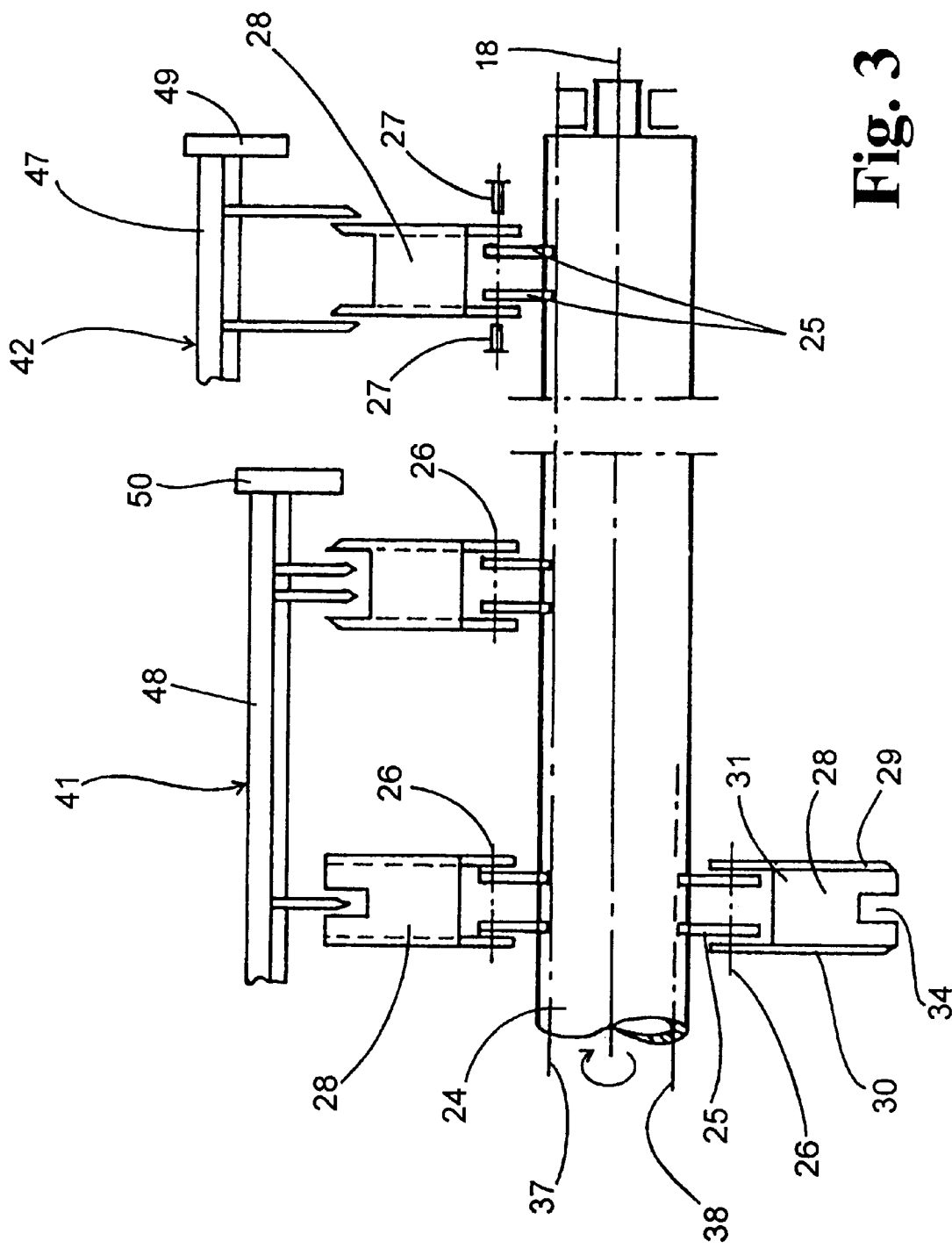
FIG. 3 is a view of the comminuting device of FIG. 2 as seen from the direction of arrow III in FIG. 2.

FIGS. 2 and 3 illustrate the comminuting device 17 in more detail. The comminuting device 17 includes a chopper rotor 23 with a rotor shaft 24. The chopper rotor 23 is disposed within a housing 66. The rotor shaft has a number of driving flanges 25. In the embodiment shown in FIG. 2, four driving flanges 25 are shown, but any number may be used. Conveying elements 28 are connected with the driving flanges 25 by rotary shafts 26. In the particular embodiment shown in FIG. 3, the rotary shafts are in the form of screw connections 27. The conveying elements 28 are freely pivotable about these rotary shafts 26.

Figure 4:
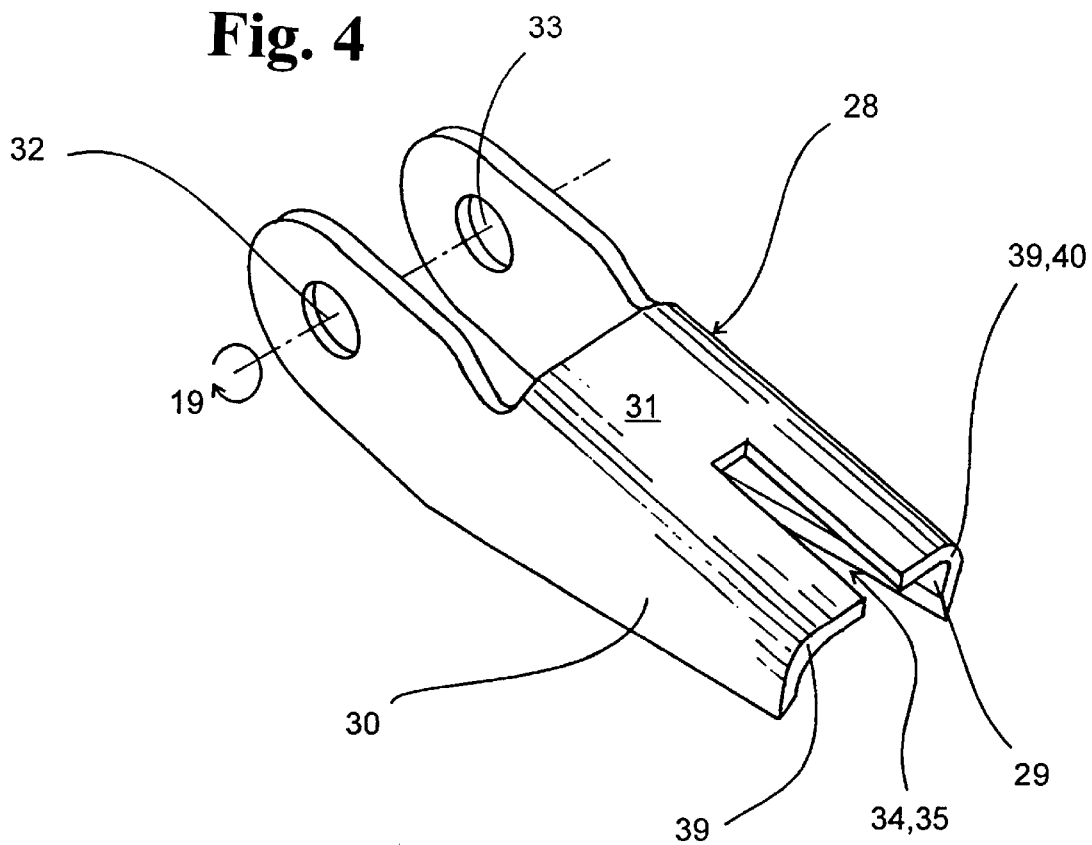
FIG. 4 is a perspective view of a conveying element having a recess.
Figure 5:
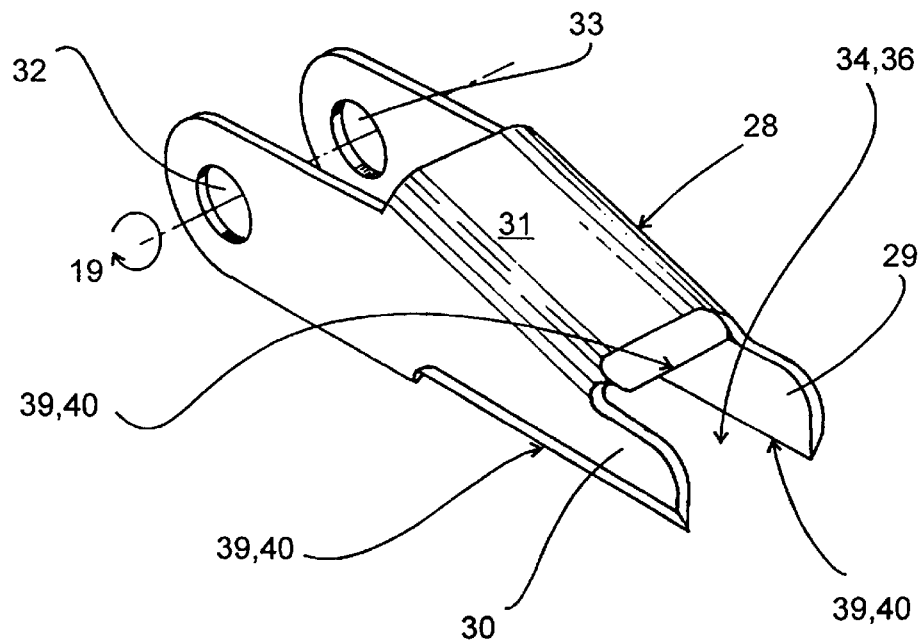
FIG. 5 is a perspective view of a second embodiment of the conveying element.

As shown in FIGS. 4 and 5, each conveying element 28 has a first arm 29 and at least a second arm 30. The first and second arms 29, 30 are connected with each other by a cross web 31. In the embodiments shown in FIGS. 4 and 5, the first and second arms 29, 30 and the cross web 31 are formed from a single piece of material. In alternate embodiments, these parts may be constructed as separate pieces and joined together in any known manner. The cross web 31 can be arranged to join the first and second arms 29, 30 at any point along the length of the arms 29, 30. The arms 29, 30 and cross web 31 are arranged so that the edges 39 of the arms 29, 30 lead the cross web 31 as the conveying element rotates with the rotor shaft 24. In the embodiment shown in FIG. 5, the edges 39 of the arms 29, 30 are constructed as cutting edges to assist in comminuting the crop streams entering the device 17. The first and second arms 29, 30 are provided with bores 32, 33 that allow the conveying element 28 to pivotably linked with the holding flanges 25. The conveying element 28 also has a recess 34 at the end opposite of the bores 32, 33. Different embodiments of the conveying element 28 have recesses 34 of different widths and lengths. The conveying element 28 shown in FIG. 4 has a slot-shaped recess 34 in the cross web 31. FIG. 5 shows a conveying element 28 having a recess 34 defined by the edges of the first and second arms 29, 30 and the top edge of the cross web 31.

FIGS. 5 illustrates an embodiment of the conveying element 28 with an angled cross web 31. In particular, the cross web 31 is tilted toward the end of the conveying element 28 opposite the bores 32, 33. This arrangement gives the conveying element 28 a scoop-like shape, increases the comminuting device's 17 conveying capacity for picking up crop, and enhances the ability of the device 17 to move air out of the agricultural machine 1.

FIG. 3 shows an embodiment in which a plurality of holding flanges 25 are aligned in rows 37, 38 oriented along the axis 18 of the rotor shaft 24. In one embodiment, holding flanges 25 in adjacent rows 37, 38 are offset from one another so that the flanges 25 of the adjacent rows 37, 38 travel on different rotational paths along the axis 18 of the rotor shaft 24.

FIGS. 2 and 3 show a number of cutting elements 41, 42 cooperating with the chopper rotor 23 in the comminuting device 17. The cutting elements 41, 42 are supported by a wall portion 43 of the agricultural harvesting machine 1 and positioned such that each cutting element 41, 42 will either pass through the recess 34 of a conveying element 28 or between adjacent conveying elements 28. At least one cutting element 41, 42 cooperates with at least one conveying element 28. This arrangement results in a multitude of cutting points in the comminuting device 17 to ensure thorough processing of the crop streams 9, 16, thereby facilitating rapid decay of the crop waste. FIG. 2 shows the cutting elements 41, 42 on one area of the chopper rotor 23 but these cutting elements 41, 42 can be mounted anywhere about the perimeter of the chopper rotor 23 in various embodiments.

In another embodiment, the cutting elements 41, 42 are supported by wall portion 43 in an adjustable manner to alter the angle and depth within the circumference (indicated by arrow 19) of the chopper rotor 23 at which each cutting element 41, 42 cooperates with the conveying elements 28. In the embodiment shown in FIG. 2, these adjustments are made possible by non-rotatably connecting each cutting element 41, 42 to a flange 44 having an oblong-hole guide 45. Each flange 44 is connected with the wall portion 43 of the agricultural machine 1 and can be adjusted through a range of positions allowed by the guide 45. Adjustment of the cutting elements 41, 42 allows the comminuting device 17 to be adapted to different crop condition variables, such as crop moisture and the length of crop stalks, in order to minimize the amount of power necessary to efficiently operate the device 17.

FIG. 2 illustrates an embodiment that further enhances the effectiveness of the comminuting device 17 by positioning multiple cutting elements 41, 42 so that they all pass through the recess 34 of a single conveying element 28 or between adjacent conveying elements 28. The adjustment of the cutting elements 41, 42 into such a position is accomplished by a rotatably connecting the cutting elements 41, 42 with the wall portion 43 via a screw connection 46. The cutting elements 41, 42 can thereby be arranged in formations resulting in simultaneous or staggered travel through the recess 34 of a conveying element 28 or between adjacent elements 28 relative to the rotation of the chopper rotor 23. Adjustment of a cutting element 42 in this manner is illustrated in FIG. 2 by dashed-dot lines.

In an embodiment shown if FIG. 3, the cutting elements 41, 42 are arranged on and pivotably connected with common supports 47, 48. FIG. 2 clearly shows the manner in which multiple cutting elements 41, 42 may be positioned to pass through the recess 34 of a single conveying element 28. The common supports 47, 48 are connected with the wall portion 43 via flanges 49, 50, which are constructed similarly to flanges 44, described above. Like flanges 44, flanges 49, 50 are equipped with oblong-hole guides (the oblong-hole guides of flanges 44 are referred to by reference number 45 in FIG. 2, while the oblong-hole guides of flanges 49, 50 are not shown) to allow adjustment of the flanges 49, 50, supports 47, 48, and cutting elements 41, 42. The cutting elements 41, 42 are also connected with the supports 47, 48 in a manner that allows removal and replacement in order to facilitate maintenance.

Figure 6:
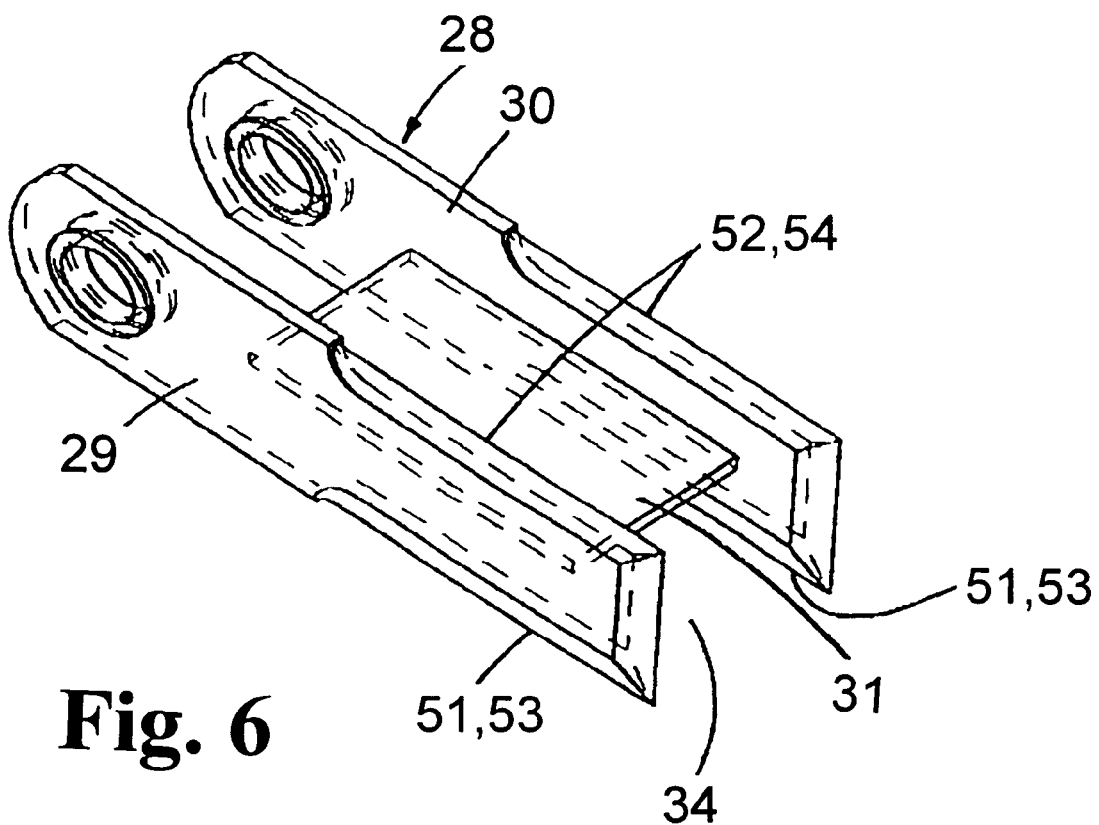
FIG. 6 is a perspective view of a third embodiment of the conveying element.

To prolong the service time of the conveying elements 28, according to the FIG. 6 embodiment the connecting cross web 31 can be arranged between the arms 29, 30 in such a way that the arms 29, 30 have one edge 51, 53, respectively, in advance of the cross web 31. Likewise, the arms 29, 30 have another edge 52, 54, respectively, trailing the cross web 31. The advancing edges 51, 53 as well as the trailing edges 52, 54 are constructed as cutting edges. When the cutting edges 51, 53 in advance of the cross web 31 go blunt, the conveying element 28 can be reversed so that the previously trailing cutting edges 52, 54 are located in advance of the cross web 31. Previously the conveying elements 28 had to be replaced or exchanged. In the simplest case this reversing takes place by releasing the screw connections 27 and the fitting of the conveying elements 28 displaced by 180°.

While the embodiments have been described in reference to a combine harvester, it is to be understood that they may be utilized on any agricultural machine in which comminution of harvested material is desired. Other objects, features and advantages of the present invention will be apparent to those skilled in the art. While preferred embodiments have been illustrated and described, this has been by way of illustration and the invention should not be limited except as required by the scope of the appended claims and their equivalents.

We claim:

1. A crop waste processor for an agricultural machine including:
    a housing operatively connected to the agricultural machine;
    a rotor shaft rotatably disposed within the housing and having an axial direction;
    a plurality of conveying elements for processing said crop waste, each conveying element including a first arm and a second arm, each arm having a length and the second arm offset from the first arm in the axial direction of the rotor shaft, and a transverse cross web interconnecting the first and second arms; and
    a plurality of driving flanges for pivotally connecting the plurality of conveying elements to the rotor shaft for rotation thereby.

2. A device according to claim 1, wherein the conveying element has a recess.

3. A device according to claim 2, wherein the recess is provided in the cross web of the conveying element.

4. A device according to claim 3, wherein the recess has an elongated slot shape.

5. A device according to claim 2, wherein the recess is defined by a side of the first arm, a side of the second arm, and the top of the cross web.

6. A device according to claim 1, wherein the cross web is angled.

7. A device according to claim 1, wherein the first and second arms lead the cross web as the conveying element rotates with the rotor shaft.

8. A device according to claim 7, wherein the first and second arms of the conveying element are provided with cutting edges on their leading edges.

9. A device according to claim 1, characterized in that the arms of the conveying element have, in the direction of rotation of the rotor shaft, an edge in advance of the cross web and an edge trailing the cross web.

10. A device according to claim 9, characterized in that the edges in advance of the cross web and the edges trailing the cross web are constructed as cutting edges.

11. A device according to claim 1, wherein each of the plurality of conveying elements is formed in a single piece.

12. A device according to claim 1, wherein the first and second arms each have a length and the cross web being operatively connected to a majority of the length of one of said arms.

13. A comminuting device in an agricultural machine including:
    a housing operatively connected to the agricultural machine;
    a rotor shaft rotatably disposed within the housing and having an axial direction;
    a flange mounted to the rotor shaft;
    a first conveying element pivotably connected with the flange and carried with the rotor shaft as it rotates, said conveying element being formed by first and second arms and a transverse cross web connecting a substantial length of said arms, the cross web having a recess between the first and second arms; and
    a first cutting element connected with a frame associated with the agricultural machine which cooperates with the conveying element as the conveying element rotates with the rotor shaft.

14. A comminuting device according to claim 13, wherein the cutting element passes through the recess of the conveying element as the conveying element rotates with the rotor shaft.

15. A comminuting device according to claim 13, wherein the cutting element passes outside of the first and second arms of the conveying element as the conveying element rotates with the rotor shaft.

16. A comminuting device according to claim 15, further including a second conveying element and wherein the cutting element passes between the conveying elements as the conveying elements rotate with the rotor shaft.

17. A comminuting device according to claim 13, further including a plurality of cutting elements and a plurality of conveying elements and wherein at least one cutting element passes through the recess of at least one conveying element as the conveying element rotates with the rotor shaft and at least one cutting element passes outside of the first and second arms of at least one conveying element as the conveying element rotates with the rotor shaft.

18. A comminuting device according to claim 17, wherein at least one cutting element passes through the recess of each conveying element.

19. A comminuting device according to claim 13, further including a second cutting element and wherein the first and second cutting elements cooperate with the conveying element at different depths relative to the circumference of the chopper rotor.

20. A comminuting device according to claim 13, further including a second cutting element and wherein the first and second cutting elements are pivotably connected with the frame and the depths at which the first and second cutting elements each cooperate with the conveying element are thereby adjustable relative to the circumference of the chopper rotor.

21. A comminuting device according to claim 13, further including a second cutting element and wherein the first and second cutting elements are pivotably connected with the frame and the angles at which the first and second cutting elements each cooperate with the conveying element are thereby adjustable relative to the circumference of the chopper rotor.

22. A comminuting device according to claim 13, further including at least a second cutting element and wherein the first and second cutting elements pass through the recess of the conveying element as the conveying element rotates with the rotor shaft.

23. A comminuting device according to claim 22, wherein the first and second cutting elements pass through the recess of the conveying element simultaneously.

24. A comminuting device according to claim 13, further including a second cutting element and a second conveying element and wherein the first and second cutting elements pass between the conveying elements as the conveying elements rotate with the rotor shaft.

25. A comminuting device according to claim 24, wherein at least two cutting elements pass between the first and second conveying elements simultaneously.

26. A commuting device according to claim 13, further including a second cutting element and wherein the first and second cutting elements are moveably connected with the frame and the position of the cutting elements relative to each other is thereby adjustable.

27. A comminuting device according to claim 13, further including a second cutting element and wherein the first and second cutting elements are offset relative to each other in the direction of rotation of the chopper rotor.

28. A comminuting device according to claim 13, further including at least one support connected with the frame, said support extending along the axial direction of the rotor shaft, and wherein the first cutting element is removably connected with the support.

* * * * *